(12) United States Patent
Schaffner et al.

(10) Patent No.: US 7,345,652 B2
(45) Date of Patent: Mar. 18, 2008

(54) ANTENNA SYSTEM AND RF SIGNAL INTERFERENCE ABATEMENT METHOD

(75) Inventors: James H. Schaffner, Chatsworth, CA (US); Jonathan J. Lynch, Oxnard, CA (US); Daniel F. Sievenpiper, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 335 days.

(21) Appl. No.: 10/826,484

(22) Filed: Apr. 16, 2004

(65) Prior Publication Data

US 2004/0196208 A1    Oct. 7, 2004

Related U.S. Application Data

(62) Division of application No. 10/154,580, filed on May 23, 2002, now Pat. No. 6,867,741.

(60) Provisional application No. 60/316,665, filed on Aug. 30, 2001.

(51) Int. Cl.
  *H01Q 1/36*    (2006.01)
  *G01S 5/02*    (2006.01)

(52) U.S. Cl. .................. 343/911 L; 343/753; 343/878; 343/909; 343/911 L; 342/357.01; 342/357.16; 342/357.06; 342/357.09

(58) Field of Classification Search ............ 343/911 L, 343/911 R; 455/62, 446–450; 701/213
See application file for complete search history.

(56) References Cited

U.S. PATENT DOCUMENTS

| | | | |
|---|---|---|---|
| 3,757,333 A * | 9/1973 | Procopio | 342/372 |
| 5,430,656 A | 7/1995 | Dekel et al. | 364/449 |
| 5,512,902 A | 4/1996 | Guthrie et al. | 342/357 |

(Continued)

FOREIGN PATENT DOCUMENTS

EP    1 098 455 A2    5/2001

OTHER PUBLICATIONS

Blas, J.M., et al., "GPS Adaptive Array for Use in Satellite Mobile Communications," *Satellite Systems for Mobile Communications and Navigation Conference Publication*, May 13-15, 1996, pp. 28-31.

(Continued)

*Primary Examiner*—Douglas W. Owens
*Assistant Examiner*—Chuc Tran
(74) *Attorney, Agent, or Firm*—Ladas & Parry

(57) ABSTRACT

Disclosed is an antenna system including a Luneberg Lens having a spherically shaped outer surface and a spherically shaped focal surface spaced from its outer surface with a plurality of patch antenna elements disposed along the focal surface of the Luneberg Lens; and a power combiner for combining signals received by said plurality of patch antenna elements. The disclosed antenna system may be used a part of a robust GPS system having a plurality of GPS satellites each transmitting a GPS signal; a plurality of airborne GPS platforms, each GPS platform including a GPS transmitter for transmitting its own GPS signal, the GPS signals being transmitted from the plurality of airborne GPS platforms being differentiated from the GPS signals transmitted by visible GPS satellites; and at least one terrestrially located GPS receiver for receiving the GPS signals transmitted by visible ones of the GPS satellites and by visible ones of said airborne GPS platforms.

28 Claims, 7 Drawing Sheets

U.S. PATENT DOCUMENTS

| | | | | |
|---|---|---|---|---|
| 5,548,294 | A | | 8/1996 | Sturza ........................ 342/372 |
| 5,570,097 | A | | 10/1996 | Aguado ...................... 342/357 |
| 5,625,729 | A | | 4/1997 | Brown ........................ 385/31 |
| 5,712,641 | A | | 1/1998 | Casabona et al. ........... 342/362 |
| 5,781,845 | A | * | 7/1998 | Dybdal et al. ................ 455/65 |
| 5,821,908 | A | * | 10/1998 | Sreenivas .............. 343/911 R |
| 5,884,181 | A | * | 3/1999 | Arnold et al. .............. 455/450 |
| 5,886,666 | A | * | 3/1999 | Schellenberg et al. ......... 701/3 |
| 6,018,316 | A | * | 1/2000 | Rudish et al. .............. 342/361 |
| 6,018,659 | A | | 1/2000 | Ayyagari et al. ............ 455/431 |
| 6,084,540 | A | | 7/2000 | Yu ............................... 342/17 |
| 6,166,679 | A | | 12/2000 | Lemelson et al. ............ 342/45 |
| 6,169,910 | B1 | * | 1/2001 | Tamil et al. .............. 455/562.1 |
| 6,252,547 | B1 | * | 6/2001 | Perry et al. ................. 342/367 |
| 6,356,247 | B1 | | 3/2002 | Hirtzlin et al. .......... 343/911 L |
| 6,373,432 | B1 | * | 4/2002 | Rabinowitz et al. ... 342/357.16 |
| 6,408,178 | B1 | * | 6/2002 | Wickstrom et al. ......... 455/427 |
| 6,449,485 | B1 | * | 9/2002 | Anzil ...................... 455/456.1 |
| 6,538,601 | B2 | * | 3/2003 | Bruno et al. ............. 342/357.1 |
| 6,593,877 | B2 | * | 7/2003 | Peeters et al. ........ 342/357.01 |
| 6,594,582 | B1 | * | 7/2003 | Quinn ........................ 701/213 |
| 6,640,189 | B2 | * | 10/2003 | Perlmutter et al. ......... 701/214 |
| 6,785,553 | B2 | * | 8/2004 | Chang et al. ............ 455/456.5 |
| 6,867,741 | B2 | * | 3/2005 | Schaffner et al. ........... 343/753 |
| 2004/0263421 | A1 | * | 12/2004 | Schaffner et al. ........ 343/911 L |

OTHER PUBLICATIONS

Fante, R.L., et al., "Cancellation of Jammers and Jammer Multipathy in a GPS Receiver," *IEEE AES Systems Magazine*, Nov. 1998, pp. 25-28.

*GPS NAVSTAR*, "Global Positioning System Standard Positioning Service Signal Specification," 2nd Ed., Jun. 2, 1995.

Matthaei, G., et al., *Microwave Filters, Impedance-Matching Networks, and Coupling Structures*, Artech House Books, Dedham, MA, Chapter 16, pp. 965-1000, 1980.

Padros, N., et al., "Comparative Study of High-Performance GPS Receiving Antenna Designs," *IEEE Trans. Antennas and Propag.*, vol. 45, No. 4, Apr. 1997, pp. 698-706.

Schrank, H., et al., "A Luneberg-Lens Update," *IEEE Antennas and Propagation Magazine*, vol. 37, No. 1, Feb. 1995, pp. 76-79.

"A Low-Profile Luneberg Lens Airborne GBS Antenna." Internet: <http://www.ecs.umass.edu/ece/allerton/papers/GBS/> 7 pages (visited May 1, 2001), no date available.

"Luneberg Lenses Made of Open-Cell Polyurethane Foams." Internet: <http://www.nasatech.com/Briefs/Jan99/NPO20339.html> 1 page (visited May 1, 2001), no date available.

"SiRF Technology, Inc.—GPS Technology White Paper." Internet: <http://www.sirf.com/gps_tech_white_paper.htm> 7 pages (visited May 1, 2001), no date available.

"NAVSTAR GPS Operations—USNO NAVSTAR Global Positioning System." Internet: <http://tycho.usno.navy.mil/gpsinfo.html> 2 pages (visited May 1, 2001), no date available.

* cited by examiner

ANTENNA SYSTEM AND RF SIGNAL INTERFERENCE ABATEMENT METHOD

CROSS-REFERENCE TO RELATED APPLICATIONS

This patent application is a divisional application of U.S. Ser. No. 10/154,580, filed on May 23, 2002 now U.S. Pat. No. 6,867,741; which claims benefit of U.S. Provisional Application No. 60/316,665, filed on Aug. 30, 2001.

TECHNICAL FIELD

Invention relates to an antenna system and a method to insure reception of Radio Frequency (RF) signals, such as Global Positioning System (GPS) signals from satellites, even in the presence of intentional or unintentional interference.

BACKGROUND OF THE INVENTION

The global positioning system (GPS) presently in use utilizes two carrier frequencies, 1.227 GHz (the L2 band) and 1.575 GHz (the L1 band), to transmit spread-spectrum signals from space vehicles, i.e., GPS satellites, to GPS receivers. The spectral densities of the signals are very small, on the order of −160 dBW/Hz. Because the carrier frequencies reside in an increasingly crowded band and the strength of the signal is so small, the GPS system is highly susceptible to interfering signals, intentionally or unintentionally directed toward the GPS receiver. In order to mitigate the effect of a potential interfering signal, phased array antennas have been developed to track the GPS space vehicles and to place nulls in the positions of interfering jammer signals. These phased array antenna systems require additional circuitry and complex algorithms to phase the elements of the array correctly and to track the jammers and/or the satellites.

There is a need for a simpler system. The antenna system described herein includes a spherical lens, with receiving elements, such as patch antennas, located on the hemispherical or approximately hemispherical focusing surface of the lens. Thus, hemispherical coverage of visible GPS satellites can be obtained. Furthermore, the signal from one GPS satellite will focus onto a spot and the signal will be picked up by one or more of the elements of the antenna and then combined with signals from the other elements to provide essentially omni-directional coverage. Thus, there is no need for circuitry to track the GPS satellites as is done with phased array technology. Nulling a jamming signal is easily performed by switches which are preferably co-located at each element which routes the offending signal to a load instead of the GPS receiver. The algorithm which determines when an element needs to be turned off can be as simple as a power detector.

An additional technique for increasing the robustness of the GPS system against interference includes a constellation of UAVs flown at a substantial distance from the GPS receiver. These UAVs have their own GPS receivers to determine their precise locations. This information is then re-coded in GPS format and placed on a microwave carrier or used to generate a spread spectrum signal. A line-of-site link is established with the GPS receiver, thus forming an extra tier to the GPS system. The GPS receiving antenna described herein could then be reduced in size due to the availability of the additional GPS information. The UAV's behave like a local GPS system. The advantage of this approach is that a jamming signal would have to be located very near one of the UAV's and would have to follow it in order effectively jam the disclosed antenna. In addition, the jammer would need to know the frequency of operation that the UAV is using, which could be varied by spread spectrum techniques. This approach of retransmission of the GPS information, coupled with the multiple beam switched null antenna system, provides a very secure GPS system which a jammer will find very difficult to interfere with.

The invention may be used in a number of different applications, including military, to provide more reliable GPS position information particularly in a noisy or jammed RF environment.

The prior art includes:

(1) N. Padros, J. I. Ortigosa, J. Baker, M. F. Iskander, and B. Thornberg, "Comparative Study of high-performance GPS Receiving Antenna Designs, *IEEE Trans. Antennas and Propag.*, Vol. 45, No. 4, April 1997, pp. 698-706.

(2) R. L. Fante and J. J. Vacarro, "Cancellation of Jammers and Jammer Multipathy in a GPS Receiver," *IEEE AES Systems Magazine*, November 1998, pp. 25-28.

(3) J. M. Blas, J. De Pablos, F. Perez, and J. I. Alonso, "GPS Adaptive Array for Use in Satellite MobileCommunications," *Satellite Systems for Mobile Communications and Navigation Conference Publication*, May 13-15, 1996, pp. 28-31.

The aforementioned publications explain how phased arrays and algorithms can be used for tracking and adaptive nulling. The present invention does not require phased arrays or adaptive nulling.

(4) R. M. Rudish, J. S. Levy, and P. J. McVeigh, "Multiple Beam Antenna System and Method," U.S. Pat. No. 6,018,316, Jan. 25, 2000.

(5) A. L. Sreenivas, "Spherical Lens Having an Electronically Steerable Beam", U.S. Pat. No. 5,821,908. Oct. 13, 1998.

These patents describe systems that use lenses for beam steering. The use of lenses to form multiple beams is well known. The present invention does not use a lens to form beams for steering but rather for instantaneous omni-directional coverage. As is disclosed herein, a null is "steered", although not in the phased array sense, by turning off elements that are receiving jamming signals. This is an important point of differentiation between the lens disclosed herein and prior art lenses. The lens disclosed herein works particularly well for GPS signals since the direction from which the interfering signal(s) is (are) coming does not need to be known, but rather the direction of the interfering source(s) are nulled without the need to specifically track the jammer(s).

(6) Ayyagari, J. P. Harrang, and S. Ray, "Airborne Broadband Communications Network, U.S. Pat. No. 6,018,659, Jan. 25, 2000

(7) M. M. Aguado, "Retransmitted GPS Interferometric System, U.S. Pat. No. 5,570,097, Oct. 29, 1996.

SUMMARY OF THE INVENTION

Briefly and in general terms, this invention provides a multiple beam antenna system for robust GPS reception. This antenna system incorporates a spherical lens, and individual receiving antenna elements at the focal surface of the lens so that the GPS signal coming from an arbitrary direction is focused onto a small spot on the focusing surface of the lens that contains one or more receiving elements. Each receiving element contains switches and impedance matching circuits so that the element can be switched off and the signal can be routed into a matched load when interference is present. From the receiving elements, the GPS signal is routed to a GPS receiver after being combined with the GPS signals coming from other directions.

In another aspect, this invention provides a method for reducing potential interference to a GPS receiver by using a tiered GPS system with unmanned air vehicles (UAVs) serving as a secondary GPS position and timing reference constellation. Each UAV receives GPS signals from the GPS satellite constellation, and from this information fixes the UAV's absolute location. This information is retransmitted to the terrestrial GPS receiver in a spread-spectrum manner similar to the method currently used for direct space reception. The retransmitted information can, if desired, be modulated onto a microwave carrier at a specified frequency.

In still another aspect, the present invention provides an antenna system comprising: a Luneberg Lens or other having a spherically shaped outer surface and a spherically shaped focal surface spaced from its outer surface; a plurality of patch antenna elements disposed along the focal surface of the Luneberg Lens; and a power combiner for combining signals received by said plurality of patch antenna elements.

BRIEF DESCRIPTION OF THE FIGURES

FIG. 4 is a block diagram of a switching and matching circuit for one of the polarization directions depicted in FIG. 3a;

DETAILED DESCRIPTION

Figure 1:
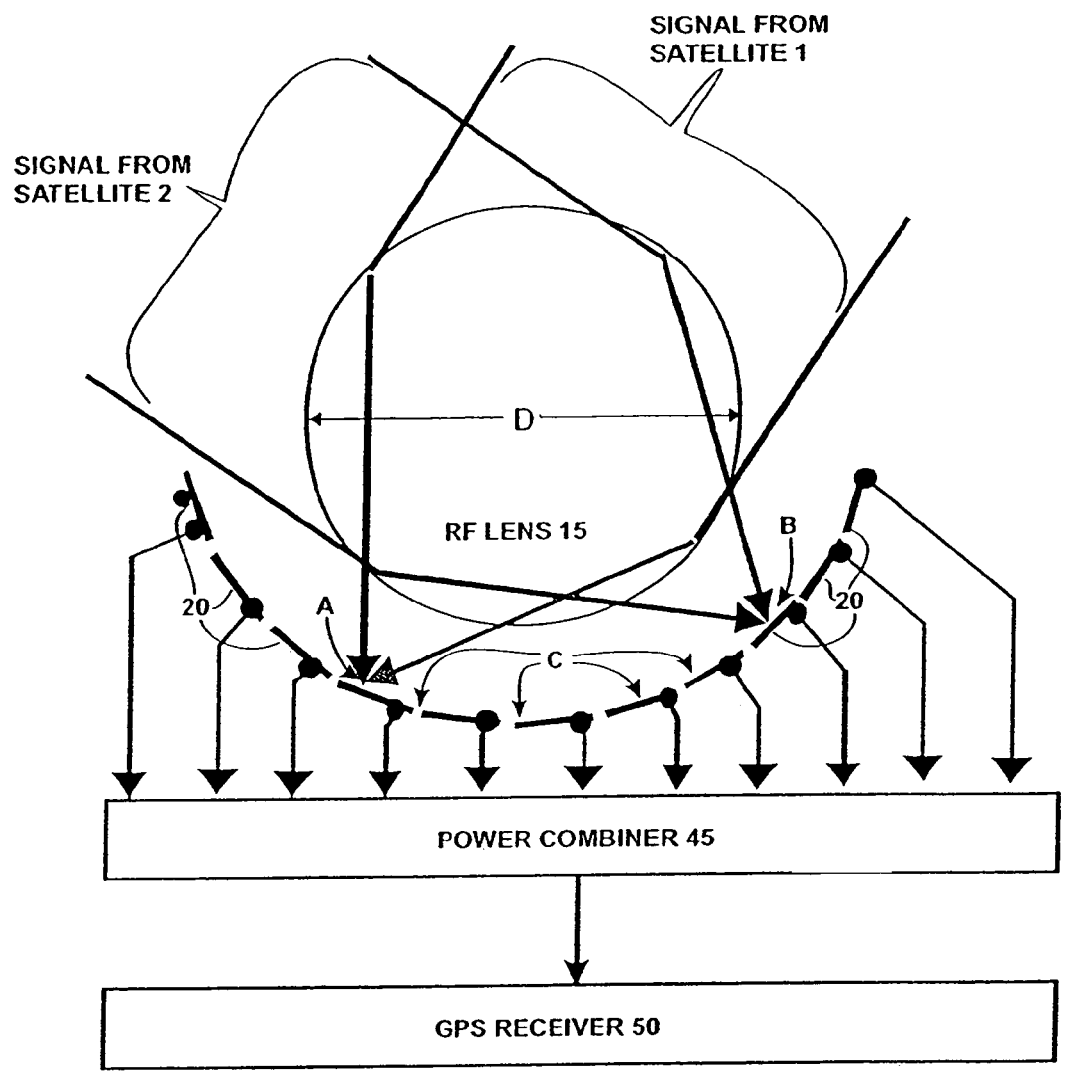
FIG. 1 is an overview of the disclosed robust GPS antenna system.

Today, military and non-military reliance on the Global Positioning System (GPS) for normal operations (not to mention emergencies) is nearly universal. The GPS system relies on a fixed number of satellites (for example the NAVSTAR constellation is composed of 24 satellites), from which a GPS receiver must acquire the signal from at least four to determine position and time. A set of GPS codes are broadcast from each satellite, the L2 coarse/acquisition code carrier is at 1227.6 MHz and the L1 precise code carrier is at 1575.42 MHz. Each frequency band is only a few MHz, although the receiver must be capable of providing a frequency offset of approximately 10 MHz to account for the Doppler effect of the satellites' motions. Spread-spectrum techniques are use to modulate each carrier with location and timing information, thus the carrier is spread as pseudo-noise across each band. Omni-directional antennas can then be used to receive signals from all of the visible satellites, since the spread-spectrum GPS receivers will correctly demodulate each coded signal with matched filters. The spectral density of the signal at the Earth's surface is as low as −160 dBW/Hz (See GPS NAVSTAR, "Global Positioning System Standard Positioning Service Signal Specification," 2nd edition, Jun. 2, 1995, which is hereby incorporated herein by reference).

Because the frequencies are fixed, and located in a relatively crowded part of the RF spectrum, the GPS signals are extremely susceptible to RF interference. This interference could come from inband emissions, wideband electrical noise, nearby-band emissions, harmonics, and intentional jamming. In recent years there have been research reports that propose more sophisticated receivers to mitigate the effects of interference of the GPS signal. Some methods use adaptive processing to remove jamming signals (see, for example, the article by R. L. Fante and J. J. Vacarro mentioned above). Other methods rely on phased array approaches to perform beam steering and/or null steering (see, for example, the article by N. Padros, J. I. Ortigosa, J. Baker, M. F. Iskander, and B. Thornberg mentioned above). These methods require additional sophisticated circuitry in a GPS receiver to perform multi-satellite and jammer tracking which is further complicated by requirements of multiple-beam steering or multiple jammer mitigation.

In this patent, a two-fold solution to eliminate interference in GPS reception is disclosed. First, a relatively simple antenna system is disclosed, which automatically receives the signals from multiple satellites. The antenna can put a null in a direction of a jammer, without adaptive null steering (as done in phased array systems). This antenna system can utilize simple signal processing circuits such as power detectors, switches, and passive filters.

Second, an additional level of reliability is described whereby a tiered positioning system is created by a constellation of unmanned air vehicles (UAVs) which become GPS location and timing sources. These UAVs are located remotely from the terrestrial GPS receiver, and can transmit the GPS positioning and timing information on any RF or microwave frequency. This combination of hemispherical coverage, null placement, and GPS signal retransmission makes jamming of the GPS information nearly impossible.

A Multiple Beam/Switched Null Antenna for Robust GPS Reception

An overview of the robust GPS antenna system is shown in FIG. 1. A important component of this antenna systems is a microwave lens 15. Lens antennas offer many of the same advantages as phased array antennas, but at a fraction of the cost and complexity. High gain, high efficiency, good spatial resolution, and multibeam performance are easily achieved with a lens antenna, and the total cost of the antenna may be many orders of magnitude less than a phased array of similar capability. An example of a particularly attractive lens for this antenna system is the Luneburg lens described by H. Schrank and J. Sanford, in "A Luneberg-Lens Update," *IEEE Antennas and Propagation. Magazine*", Vol. 37, No. 1, February 1995, pp. 76-79, the disclosure of which is hereby incorporated herein by reference. The Luneburg lens antenna gives good antenna performance over a very wide field of view. Ideally, this lens consists of a spherically symmetric, graded index material with a radial index of refraction variation (for a unit radius lens) of:

$$n(r)=\sqrt{2-r^2}$$

where n(r) is the index of refraction of the spherical RF lens 15 at a radial distance r from its center.

In practice, this continuously varying index is approximated by concentric shells of material with differing dielectric constants, an approximation that facilitates lens 15 fabrication and still gives excellent performance. Such RF lenses 15 are know in the art. See, for example, the articles identified as (4) and (5) above. RF lenses 15 are also commercially available from sources such as Rozedal Associates of Sante, Calif. 92071. The operation of the lens 15 is best understood by tracing ray paths as the lens receives energy from an incoming plane wave. The index of refraction is graded in such a way as to cause the impinging rays to focus at a single point (see point A for the focussed signal from satellite 1 and point B for the focussed signal from satellite 2) on the surface C of the antenna.

Receiving elements 20 are located along the focal surface C of the lens, as shown in FIG. 1. Each GPS signal arriving from the instantaneous location of its satellite will be focussed onto this surface C. Thus there will be a set of focal points, one from each GPS satellite. For the case of a spherically symmetric lens 15, it is possible to receive a GPS signal from all visible GPS satellites. Also, a focal spot may straddle two or more receiving elements 20, in which case all of the elements that fall within the focal spot will receive the signal from the particular GPS satellite. The focal surface C is designed to be large enough (that is the diameter of the lens is big enough), that enough receiving elements 20 are included to resolve the directions of all incoming GPS signals.

Since the GPS signal is spread-spectrum encoded, the signals received from each antenna element 20 can be combined in a combiner 25 and then routed into a GPS receiver 30. Thus, this antenna system can observe all of the GPS satellites in a hemisphere, much like the simple automotive GPS receive antennas known in the prior art, without having to track the individual satellites. Twelve and sixteen way power combiners, for example, are commercially available from Mini-Circuits of Brooklyn, N.Y. 11235 and thus it is certainly feasible to make combiners with a larger number of inputs. Only eleven patch elements 20 are shown in FIG. 1. This number was chosen simply for ease of illustration. The number of patch elements 20 which would be utilized in a practical antenna is much larger, as will be described subsequently, and thus a power combiner with an appropriate number of input would be needed or multiple combiners would be staged to provide the number of inputs needed.

Figure 2:
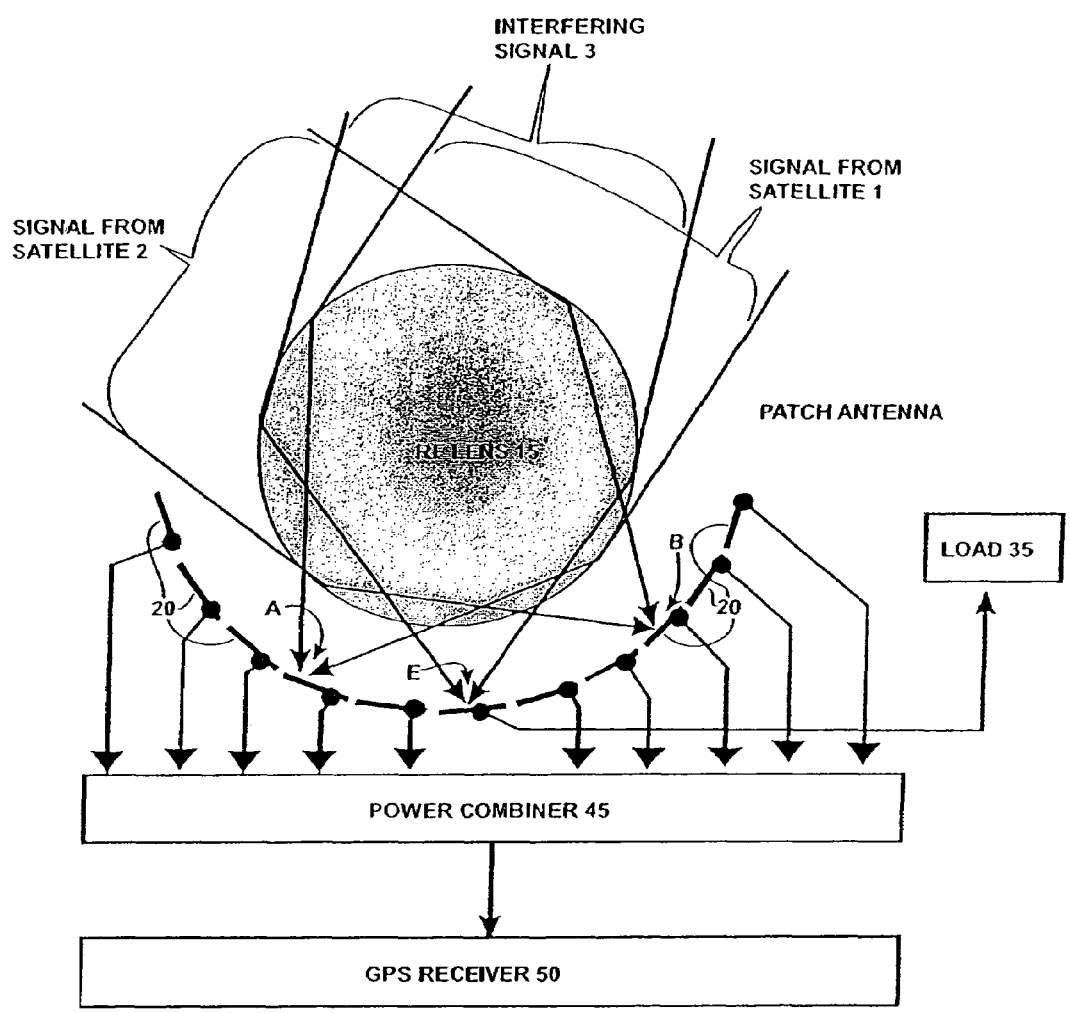
FIG. 2 is an overview of the disclosed robust GPS antenna system similar to that of FIG. 1, but showing an interfering signal arriving at the antenna.

If an interfering signal 3 is present, as shown in FIG. 2, the particular element or group of elements 20 that is or are at the focus E of this interfering signal 3 are switched off. In FIG. 2 the switching off of the particular affected element is indicated by the absence of a connecting line from the affected element to the combiner 25. As such, the interfering power is prevented from entering the GPS receiver 30. It is preferable that this unwanted power be dissipated into a load 35 so as not to be reflected back toward the source, which is important in jammer situations. It is also important that the interfering power be dissipated into a matched load 35 to prevent mutual coupling between receive elements from degrading the resolution of the system by having the interfering signal 3 "spill" over to other receive elements 20. Of course if the interfering signal 3 is coming from the same direction as one of the GPS signals 1, 2, the interfered-with GPS signal is lost as well. However, all other non-interfered directions can still receive the GPS signals from other satellites and, since the lens 15 has a wide field of view, enough of the GPS signals are received to be able to determine timing and position.

Figure 3A:
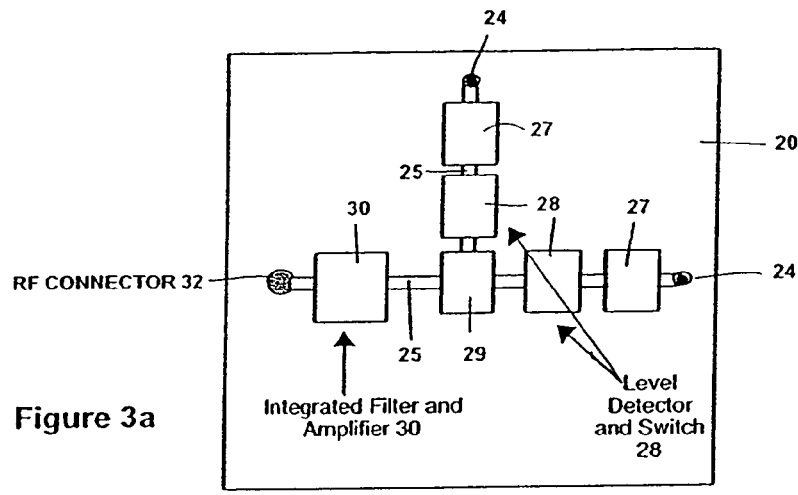
FIGS. 3a and 3b depict an example of a multiple-layer switchable receiving patch element, FIG. 3a being a view from the backside of the element (that is away from the lens), and FIG. 3b being a view from the side.
Figure 3B:
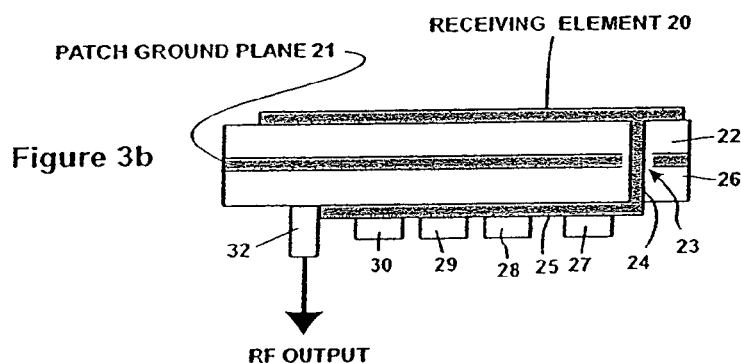

An example of an antenna element 20 that can perform the functions of receiving and routing the GPS signal into the receiver 50 or a load 35 is shown in FIGS. 3a and 3b which depict is a multiple-layer patch antenna 20 for receiving a circularly polarized GPS carrier signal. Since the GPS carrier signal is circularly polarized, each patch antenna element 20 preferably has two feed points 24 to receive the GPS signal. The feed points 24 connect the patch antenna 20 to transmission lines 25 preferably located on the backside of the patch element substrate 26. Transmission lines 25 are preferably microstrip transmission lines. The probe feeds 24 penetrate through the layers 22, 26 of dielectric as shown in FIG. 3b. A ground plane 21 is disposed between layers 22 and 26 and is preferably formed of copper. A matching circuit 27 is used in connection with each feed point 24 to match the impedance of the patch antenna to 50 ohms (or some other appropriate transmission line impedance).

Figure 4:
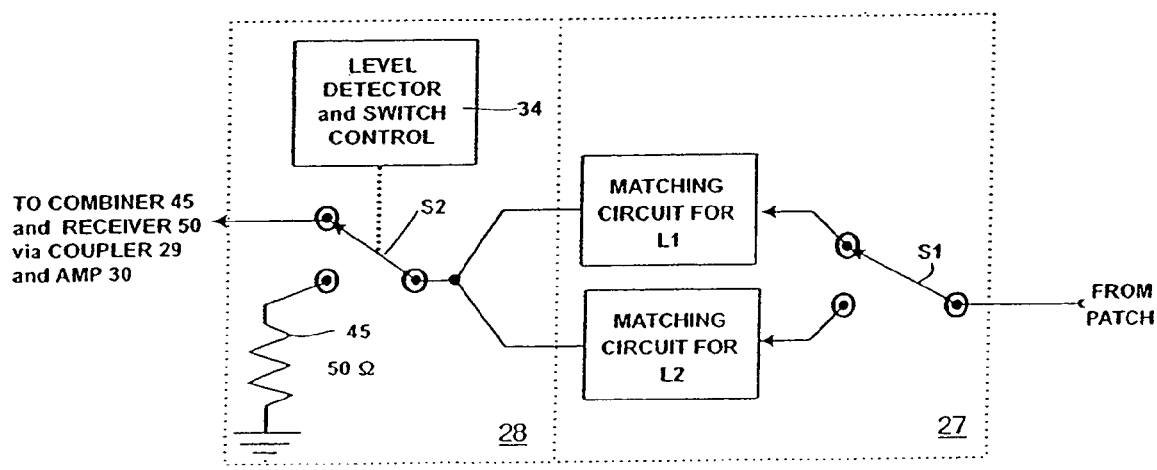

A block diagram of a switching and matching circuit 27 for one feed point 24 is shown in FIG. 4. A switch S1 routes the received signal through an appropriate matching circuit for frequency band L1 or frequency band L2 reception, and a switch S2 routes the signal toward the GPS receiver 50 or into a matched load 35. Methods for fabricating patches 20 and impedance matching circuits L1, L2 are well known to those skilled in the art; indeed, an example of a specific dual band patch antenna is presented in the article by N. Padros, J. I. Ortigosa, J. Baker, M. F. Iskander, and B. Thornberg noted above. If reception of both signal frequencies is required at the same time, a diplexing network can be used instead of the switches S1 and S2. The design of diplexing networks is also well known to those skilled in the art (See, for example, G. Matthaei, L. Young, and E. M. T. Jones, *Microwave Filters, Impedance-Matching Structures, and Coupling Structures*, Artech House Books, Dedham, Mass., 1980.)

Since each patch receiving element 20 has two feed points 24, it also preferably has two matching and switching circuits 27, one of which is associated with each feed point 24. The switches S1 of the two matching circuits 27 are preferably switched in unison so that the two feed points 24 are either matched to the L1 frequency band or to the L2 frequency band. For course, if the receiver 50 to which the patches 20 are coupled is a mono band GPS receiver, then there would be no reason to provide a capability to switch between the L1 and L2 frequency bands and the switch S1 and at least the unused matching circuit could then be omitted. In that case element 27 would either include a single matching circuit or would comprise a simple direct connection.

Instead of utilizing two circuits 27 per patch antenna element 20, the block diagram of FIG. 3a can be modified to utilize only one circuit 27 per patch antenna element 20 if the circuit 27 is placed downstream, signal-wise, from coupler 29. However, in such an embodiment, the two polarizations provided by the two feed points 24 could not be independently controlled. As such, the embodiment depicted by FIG. 3a having two circuits 27 per patch 20 is preferred, since it permits independent control over signals arriving from the two different feed points 24 on each patch antenna element 20. As already mentioned, each circuit 27 preferably has a switch S1 and a plurality of filters, but each circuit 27 could be simplified for mono band operation.

The determination of the presence of an interfering signal can be made simply by a level detector circuit 34 that causes switch S2 to route the signal into matched load 35 if the received power exceeds above a predetermined value. Of course, other criterion for switch S2 control could also be implemented. The two components of the GPS carrier on each feed point 24 are in phase quadrature because the GPS signal is circularly polarized. These two components are combined in a hybrid coupler 29, and then are fed into an optional low-noise amplifier and filter 30 and then on to an optional RF connector 32, before travelling onto combiner 45 and receiver 50 (FIG. 2).

An estimation of the number of elements 20 that are required for hemispherical space coverage as a function of spherical lens diameter D can be determined as follows. The resolution of the antenna system is related to the minimum spot size to which a plane wave beam can be focused. Diffraction theory tells us that the minimum disk radius for an aperture of diameter D is given by (this is known as the Airy disk radius—see, for example, Eugene Hecht, Optics, Addison-Wesley Publishing Company, Reading, Mass., 1987):

$$r_A = 1.22 \frac{f\lambda}{D}$$

where:
D is the diameter of the sphere;
and f is the focal length of the lens; and
λ is the free space wavelength.

Thus the area of coverage of a single beam at its focal point is $\pi r_A^2$. All signals that are incident on the focal surface are guaranteed to be received if the receive elements 20 are placed no further apart than an Airy disk radius. For a Luneberg lens, f/D=0.5 so that $r_A$=0.61λ. The hemispherical area of a Luneberg lens is $2\pi(D/2)^2$ so that the very minimum number of elements that are needed is:

$$N = \frac{2\pi \left(\frac{D^2}{4}\right)}{\pi r_A^2} = 1.34 \left(\frac{D}{\lambda}\right)^2$$

For the L2 frequency of 1.23 GHz, λ=24.4 cm, so for a one meter diameter lens (D/λ)=4.1 and the minimum number of elements is 23.

Figure 5:
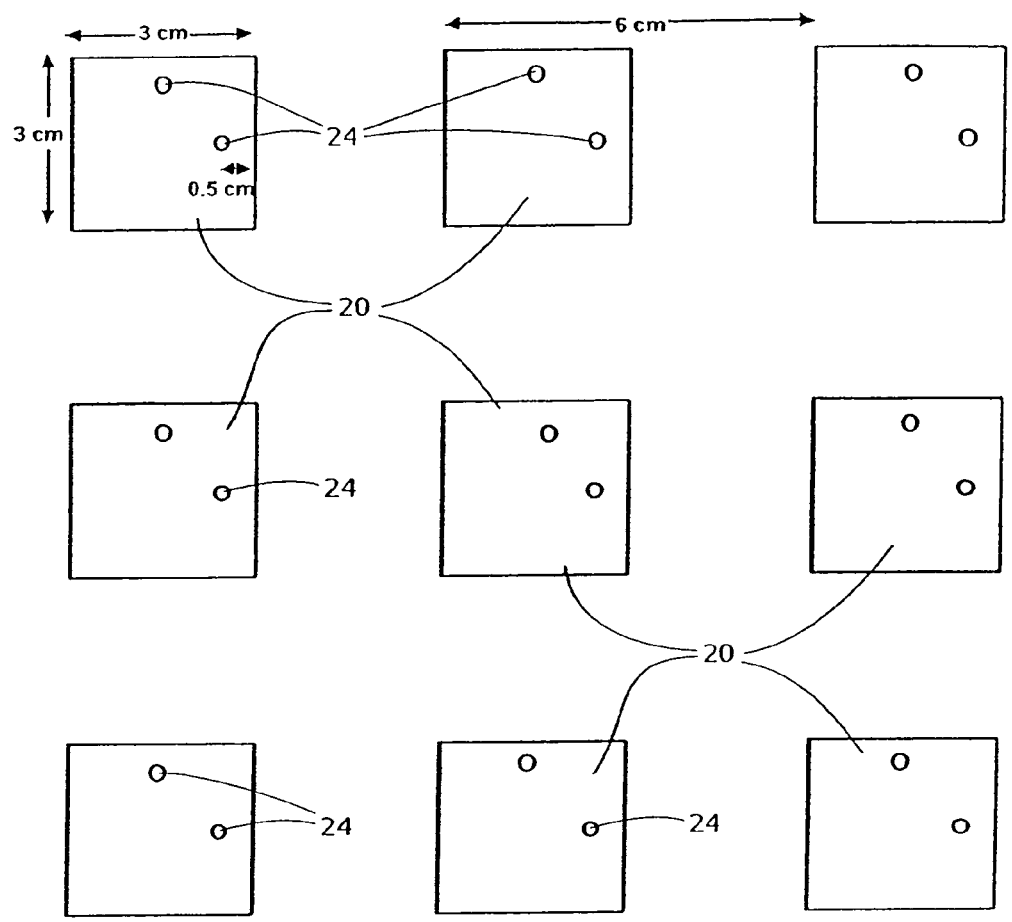
FIG. 5 is a 3×3 probe fed array of patches used to used to design the impedance matching circuits of FIGS. 6 and 7.
Figure 6A:
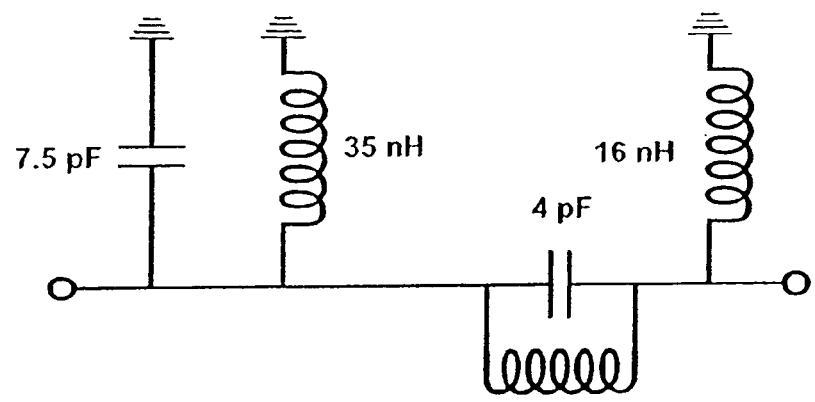
FIG. 6a is an impedance matching circuit for the array model of FIG. 5 for band L2.
Figure 6B:
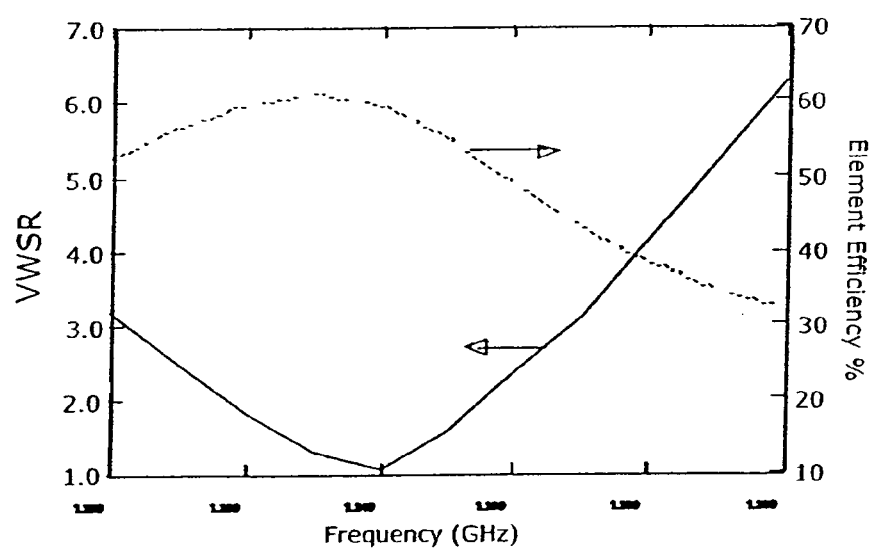
FIG. 6b is a graph of the receive element performance for L2 band for the circuit of FIG. 7a showing that it provides impedance match to 50 W at 1.23 GHz with an antenna element radiation efficiency of 61%.
Figure 7A:
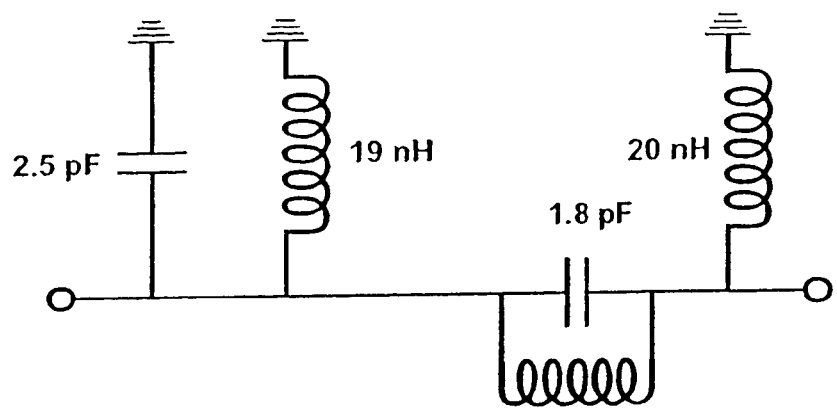
FIG. 7a is an impedance matching circuit for the array model of FIG. 5 for band L1.
Figure 7B:
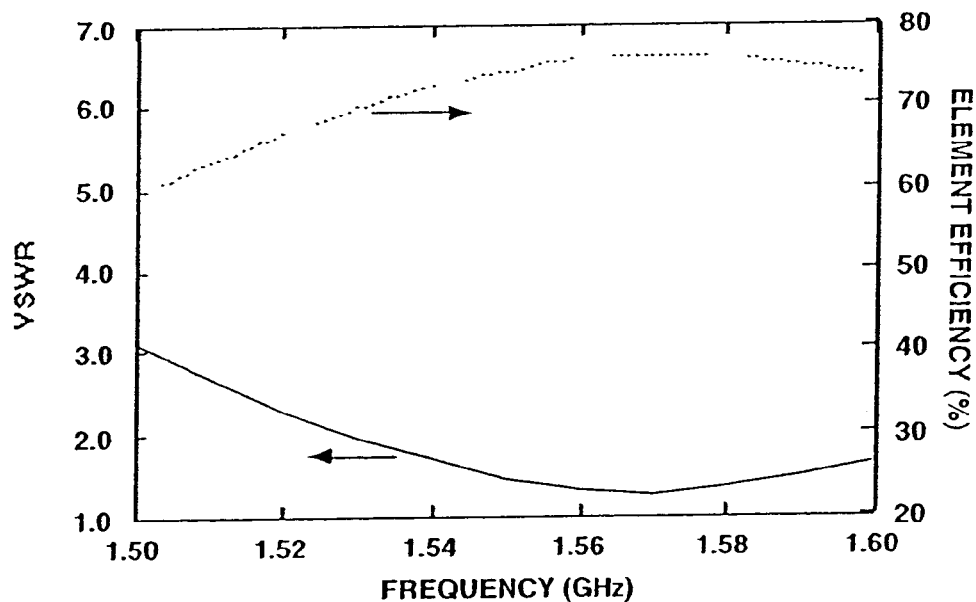
FIG. 7b is a graph of the receive element performance for L1 band for the circuit of FIG. 7a showing that it provides an impedance match to 50 W at 1.57 GHz and a radiation efficiency of 77%.

A particular embodiment (not an optimum embodiment) for an antenna system design is to choose a Luneberg lens of diameter 1 meter. The receive elements 20 are coaxial fed patches of the type shown in FIGS. 3a and 3b. In order to determine an embodiment for the matching circuits L1 and L2, a 3×3 probe fed array of patches, shown in FIG. 5, was modeled. This array would approximate a portion of the array near the bottom of the spherical focal surface. The model assumed that the antenna elements 20 were planar and radiated (or received) from air. A more sophisticated model would use physical optics to include the lens, but the results obtained here could be used as a first iteration in the design of the antenna system, with further iterations obtained from modeled or measured results. The dielectric constant of the substrate material was chosen to be 4.0, which corresponds to FR-4 circuit board epoxy or Arlon Thermount® 55RT material. The thickness of the substrate between the radiating patch and the groundplane was 1.6 mm. The patch element dimensions are 3 cm×3 cm and they are spaced on 6 cm centers. In order to obtain a circuit for matching elements L1 and L2, this array was modeled using IE3D®, a commercially available electromagnetic simulation software package, to determine the self and mutual impedances for this array, and using Advanced Design System, a commercially available microwave and RF circuit simulation package by Agilent Technologies to determine the matching circuit for the array. It was assumed that only nearest neighbors could contribute significantly to the mutual coupling between elements since any incoming plane wave beam would be focused to a spot corresponding to a single element. More elements would need to be included in the modeling if the focused spot size covered more than one element. From the simulation, we found a that the circuit shown in FIG. 6 provided a impedance match to 50 Ω at 1.23 GHz and an antenna element radiation efficiency of 61%, while the circuit shown in FIG. 7 provided an impedance match to 50 Ω at 1.57 GHz and a radiation efficiency of 77%. The locations for the feed points 24 were determined empirically using antenna modeling software and seeking an appropriate impedance match for the frequency or frequencies of interest (here 1.23 GHz and 1.57 GHz).

Figure 8:
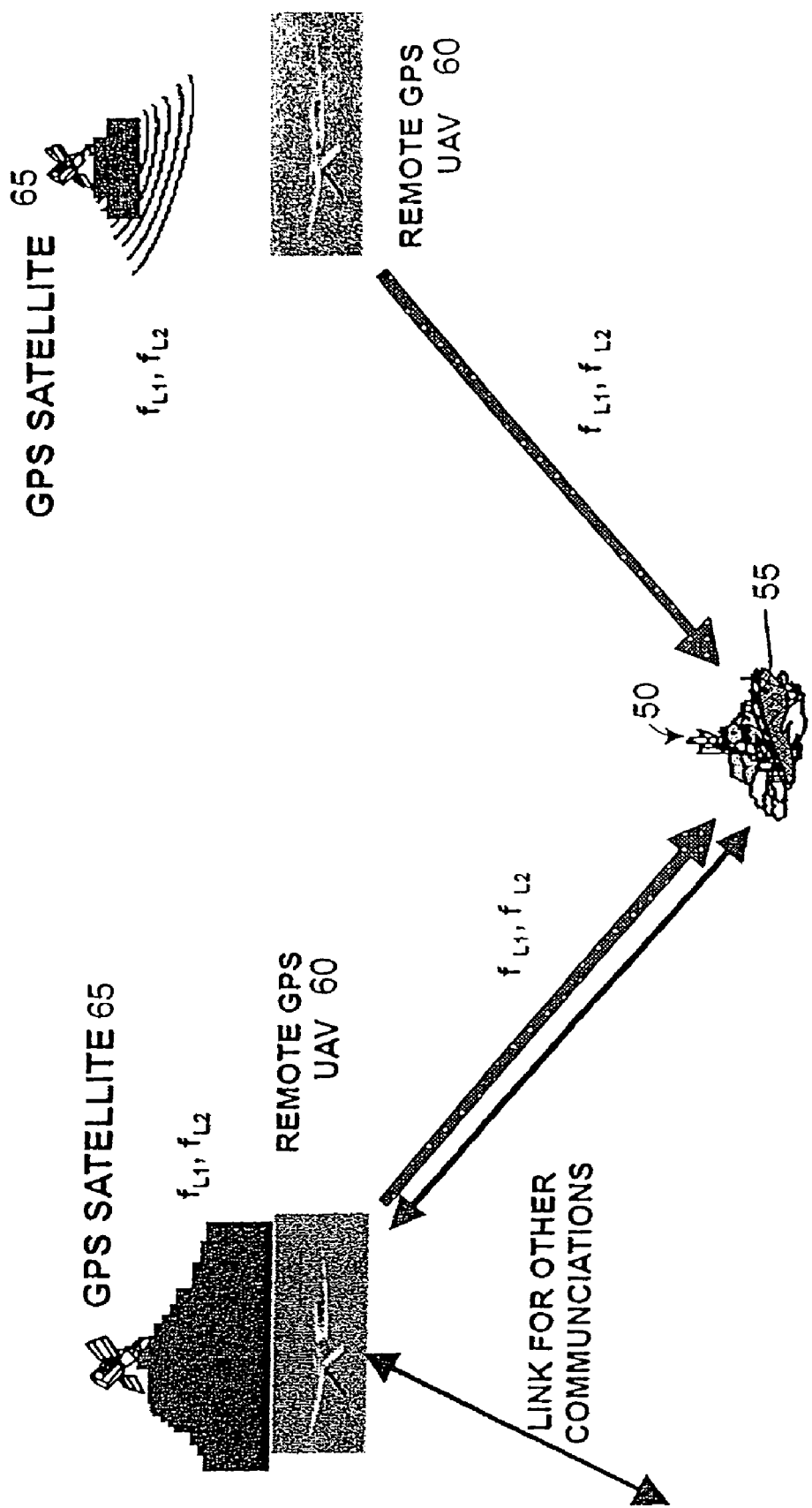
FIG. 8 depicts a tiered system for improving GPS reception.

The GPS receiver 50 on the ship 55 shown in FIG. 8 preferably includes an lens antenna system of the type described above. In this case the antenna system can be quite a bit smaller if the frequencies used are still higher. For example, if 5 GHz is used as the frequency of the incoming signals, then λ=6 cm, and the Airy radius is $r_A$=3.7 cm. A lens that is 4λ in diameter is then only 24 cm.

A Robust, Anti-Jamming GPS System Using Tiered Retransmission

An additional level of robustness for GPS reception can be achieved by creating a "localized" constellation of GPS transmitters to provide an extra tier in the GPS system. This tiered system for GPS reception is shown in FIG. 8. In that figure, air vehicles, and preferably unmanned air vehicles or UAVs 60, fly at a distance that is on the order of perhaps hundreds of nautical miles from the GPS receiver 50 located on a vehicle 55 such as the depicted ship. Each UAV 60 has a GPS receiver 50 on board so it can determine its precise location. The UAV location and timing information is modulated onto a microwave carrier and then broadcast to the terrestrial GPS receiver 50 on vehicle 55. Each UAV 60 can broadcast on the same (as other UAV(s) or as the satellites) or different frequencies. The various UAVs 60 can be differentiated one from one another by using spread spectrum transmission techniques with a different coding scheme for each UAV 60 (and different from the satellites, if need be) and/or they can be differentiated by using different transmission frequencies. The modulated signal is coded preferably in the same way as the signal coming from the GPS satellites 65, but at a different frequency and/or with different spread spectrum encoding so that the receiver 50 can differentiate the satellite GPS signals from the GPS signal(s) transmitted by the UAV(s) 60. Robustness against interfering signals is thus achieved by positioning the UAVs 60 away from the interfering source and by using a frequency for transmission different from the interfering source.

The receiver on the terrestrial vehicle 55 preferably includes an antenna system of the type previously described herein. Of course other types of antenna systems, such as phased arrays, could be used instead of the lens system disclosed herein. The receivers on the UAVs 60 can also utilize the disclosed antenna system.

Having described the invention in connection with presently preferred embodiments, modification will now certainly suggest itself to those skilled in this technology. As such, the invention is not to be limited to the disclosed embodiments except as required by the appended claims.

What is claimed is:

1. A robust GPS system comprising;
    (a) a plurality of GPS satellites each transmitting a GPS signal;
    (b) a plurality of airborne GPS platforms, each GPS platform including a GPS receiver for receiving GPS signals from a number of visible GPS satellites, each airborne platform also including a GPS transmitter for transmitting its own GPS signal, the GPS signals being transmitted from the plurality of airborne GPS platforms being differentiated from the GPS signals transmitted by the visible GPS satellites;
    (c) at least one terrestrially located GPS receiver for receiving the GPS signals transmitted by visible ones of the GPS satellites and by visible ones of said airborne GPS platforms.

2. The robust GPS system of claim 1 wherein the airborne GPS receiver includes an antenna system comprising:
    (a) a Luneberg Lens having a spherically shaped outer surface and a spherically shaped focal surface spaced from its outer surface;
    (b) a plurality of patch antenna elements disposed along the focal surface of the Luneberg Lens; and
    (c) a power combiner for combining signals received by said plurality of patch antenna elements.

3. The robust GPS system of claim 2 wherein each patch antenna element of said plurality of patch antenna elements has at least one feed point for receiving signals, the signals at said feed points being selectively routed to said power combiner based upon certain predetermined signal criteria.

4. The robust GPS system of claim 2 wherein each patch antenna element of said plurality of patch antenna elements has at least two feed points for receiving circularly polarized signals, the signals received at said feed points being selectively routed to said power combiner based upon certain predetermined signal criteria.

5. The robust GPS system of claim 4 wherein the signals routed from the feed points of each patch antenna element are routed via a first switch and one of a plurality of filters having different band pass characteristics.

6. The robust GPS system of claim 5 wherein the signals routed from the feed points of each patch antenna element are routed via a second switch, the second switch routing the signals to either a matched load or said power combiner.

7. The robust GPS system of claim 6 wherein the second switch is controlled based upon said certain predetermined signal criteria.

8. The robust GPS system of claim 7 wherein the predetermined signal criteria is a signal level of the signal entering the second switch and wherein the second switch is switched to couple the signals entering the second switch to said matched load when the signal level exceeds a predetermined level.

9. The robust GPS system of claim 8 wherein the signals from the at least two feed points associated with a single patch antenna element are routed via a coupler before being passed to said second switch.

10. The robust GPS system of claim 4 wherein the signals routed from the feed points are routed via a switch for routing the signals to either a matched load or said power combiner.

11. The robust GPS system of claim 10 wherein the second switch is controlled based upon said certain predetermined signal criteria.

12. The robust GPS system of claim 11 wherein the predetermined signal criteria is a signal level of the signal entering the second switch and wherein the second switch is switched to couple the signals entering the second switch to said matched load when the signal level exceeds a predetermined level.

13. A method for reducing potential interference to a GPS receiver responsive to GPS signals transmitted from a constellation of GPS satellites, the method comprising:
    deploying air vehicles each serving as a platform for a secondary GPS position and timing reference transmitter, each platform including a receiver for receiving GPS signals from the GPS satellite constellation;
    transmitting the secondary GPS position and timing reference information from the transmitters on the air vehicles, the secondary GPS position and timing reference information being based upon the GPS signals received from the GPS satellite constellation at each platform; and
    receiving the secondary GPS position and timing reference information from the transmitters on one or more of the air vehicles at said GPS receiver.

14. The method of claim 13 wherein the GPS receiver is terrestrially located.

15. The method of claim 14 wherein the information is transmitted from the air vehicles to the terrestrial GPS receiver in a spread-spectrum manner similar to the manner used for direct satellite to terrestrial GPS receive reception.

16. The method of claim 14 wherein the information is transmitted from the air vehicles to the terrestrial GPS receiver by modulation onto a carrier at a specified frequency.

17. The method of claim 13 wherein the air vehicles are unmanned.

18. The method of claim 13 wherein the GPS receiver includes an antenna system comprising:
    (a) a Luneberg Lens having a spherically shaped outer surface and a spherically shaped focal surface spaced from its outer surface;
    (b) a plurality of patch antenna elements disposed along the focal surface of the Luneberg Lens; and
    (c) a power combiner for combining signals received by said plurality of patch antenna elements.

19. The method of claim 18 wherein each patch antenna element of said plurality of patch antenna elements has at least one feed point for receiving signals, the signals at said feed points being selectively routed to said power combiner based upon certain predetermined signal criteria.

20. The method of claim 18 wherein each patch antenna element of said plurality of patch antenna elements has at least two feed points for receiving circularly polarized signals from at least the transmitters on the air vehicle, the signals received at said feed points being selectively routed to said power combiner based upon certain predetermined signal criteria.

21. The method of claim 20 further including routing the signals routed from the feed points of each patch antenna element via a first switch and one of a plurality of filters having different band pass characteristics.

22. The method of claim 21 further including routing the signals routed from the feed points of each patch antenna element via a second switch, the second switch routing the signals to either a matched load or said power combiner.

23. The method of claim 22 further including controlling the second switch based upon said certain predetermined signal criteria.

24. The robust GPS system of claim 23 wherein the predetermined signal criteria is a signal level of the signal entering the second switch and wherein the second switch is switched to couple the signals entering the second switch to said matched load when the signal level exceeds a predetermined level.

25. The method of claim 24 further including routing the signals from the at least two feed points associated with a single patch antenna element via a coupler before being passed to said second switch.

26. The method of claim 25 further including routing the signals routed from the feed points via a switch for routing the signals to either a matched load or said power combiner.

27. The method of claim 26 further including controlling the second switch based upon said certain predetermined signal criteria.

28. The method of claim 27 wherein the predetermined signal criteria is a signal level of the signal entering the second switch and wherein the second switch is switched to couple the signals entering the second switch to said matched load when the signal level exceeds a predetermined level.

* * * * *